US006902809B1

(12) United States Patent
Mittendorf

(10) Patent No.: US 6,902,809 B1
(45) Date of Patent: Jun. 7, 2005

(54) RHENIUM TANTALUM METAL ALLOY

(75) Inventor: Don L. Mittendorf, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/880,912

(22) Filed: Jun. 29, 2004

(51) Int. Cl.[7] .................. B32B 15/04; C22C 1/04; C22C 27/00
(52) U.S. Cl. .............. 428/408; 428/457; 419/28; 419/29; 419/32; 420/433
(58) Field of Search .................. 428/655, 408, 428/634, 457; 75/245, 232; 148/400, 559; 419/28–29, 32; 420/433; 60/770; 29/890.01

(56) References Cited

U.S. PATENT DOCUMENTS

| | | | | |
|---|---|---|---|---|
| 2,391,458 A | * | 12/1945 | Hensel | 428/655 |
| 3,024,522 A | * | 3/1962 | Cacciotti | 428/634 |
| 3,105,290 A | * | 10/1963 | Sackinger et al. | 75/240 |
| 3,554,737 A | * | 1/1971 | Foster et al. | 420/433 |
| 3,791,821 A | * | 2/1974 | Buckman, Jr. | 420/427 |
| 4,045,247 A | * | 8/1977 | Morris | 136/240 |
| 4,155,660 A | * | 5/1979 | Takahashi et al. | 400/124.32 |
| 4,241,135 A | | 12/1980 | Lee et al. | |
| 5,049,355 A | | 9/1991 | Gennari et al. | |
| 5,437,744 A | | 8/1995 | Carlen | |
| 5,722,034 A | | 2/1998 | Kambara | |
| 5,740,516 A | | 4/1998 | Jiranek, II et al. | |
| 6,711,901 B1 | * | 3/2004 | Canfield et al. | 60/770 |
| 2003/0039573 A1 | | 2/2003 | Sherman et al. | |
| 2003/0046922 A1 | * | 3/2003 | McGrath et al. | 60/253 |
| 2003/0217828 A1 | | 11/2003 | Opoku-Adusei et al. | |

FOREIGN PATENT DOCUMENTS

| | | |
|---|---|---|
| JP | 60243242 A | 12/1985 |
| JP | 2213403 A | 8/1990 |
| WO | WO 0048696 A1 | 8/2000 |

* cited by examiner

Primary Examiner—John J. Zimmerman
(74) Attorney, Agent, or Firm—Ingrassia Fisher & Lorenz

(57) ABSTRACT

The present invention provides a method for preparing a rhenium-tantalum alloy with improved strength and ductility characteristics. The method includes mixing powders of rhenium and tantalum with a weight ration of approximately 97% rhenium to approximately 3% tantalum. The powdered blend is then compressed to a green state. The green compress of rhenium and tantalum is then sintered such that tantalum goes into solid solution with rhenium. The sintered material is then cold rolled. The cold rolling disperses oxides away from concentrations in the alloy grain boundaries. If desired, the alloy may then be annealed. The result is a rhenium-tantalum alloy that displays improved high temperature strength and ductility over pure rhenium materials. The present alloy is particularly suited to fabrication of rocketry components such as valve bodies, poppets, seats, and nozzles.

21 Claims, No Drawings

RHENIUM TANTALUM METAL ALLOY

FIELD OF THE INVENTION

The present invention relates to rhenium alloys. More particularly the invention relates to rhenium/tantalum alloys with good ductile properties and oxidation resistance.

BACKGROUND OF THE INVENTION

Metallurgists continually seek to exploit from available resources, such as elements in the periodic table of elements, different materials with favorable characteristics. Strength and weight are often competing design requirements that test the limits of known materials. In the design of aircraft and rockets, for example, there is a need for the continued development of high strength materials with low weights. When components are exposed to the high temperatures of rocket exhaust, there is a further need for materials with desirable physical properties that can also withstand very high temperatures and pressures.

One particularly useful metal is elemental rhenium. Rhenium has atomic number 75 in the periodic table of elements. It is known as a refractory metal meaning it has a high melting point. Rhenium metal melts at approximately 5756° F. However, rhenium begins to oxidize at a much lower temperature, approximately 1000° F. Rhenium retains excellent high temperature strength of approximately 6–9 Ksi (kips per square inch, 1000 pounds per square inch) at 4000° F. However, much before it reaches this temperature, the oxidation temperature of rhenium becomes a factor. The oxidation of rhenium produces a volatile oxide. Rhenium oxides will continually evaporate from the surface of the rhenium, even until the material is entirely vaporized.

Pure rhenium also has useful characteristics for fabrication of component parts. Rhenium has a high level of plastic deformation capability at low temperatures. This is an important quality of a reliable structural material. Rhenium metal is unique in this way compared to other high melting point metals which exhibit no plastic behavior when at lower temperatures. Rhenium's ductile behavior, however, is markedly degraded at very high temperature ranges. While at high temperatures, rhenium still has remarkable strength, its increasing brittleness becomes an issue. The high temperature brittle behavior of rhenium makes the mechanical limits of a component dependant on flaws and therefore not reproducible under all circumstances of design. A high temperature ductile version of pure rhenium would be desirable for structural use.

The above noted advantages of rhenium have made it a desirable material for use in rocketry applications. Rockets, missiles, and other vehicles that travel through and outside the earth's atmosphere can experience severe operating conditions including temperature and pressure extremes. Certain vehicle parts, including for example, valve bodies, nozzles, poppets, and seats, which are often located on the vehicle's propulsion or attitude control systems, can be subject to hot gas effluent. These components are directly exposed to high temperatures and pressures associated with hot gas effluent. Thus, there is an ongoing need to fabricate valves and nozzles from materials with improved strength and high temperature ductility.

Hence there is a need for an improved rhenium alloy. There is a need for a rhenium alloy with improved ductile properties at high temperatures compared to pure rhenium. Further the rhenium alloy should retain desirable characteristics of rhenium such as good high temperature strength and low temperature ductility. The improved rhenium alloy should be adaptable to the fabrication of rocket control components such as valves, valve bodies, poppets, seats, and nozzles. The present invention addresses one or more of these needs.

SUMMARY OF THE INVENTION

The present invention provides an improved rhenium tantalum metal alloy. The alloy is a blend of up to approximately 97% rhenium with up to approximately 3% tantalum by weight. The alloy is formed by compressing powders of rhenium and tantalum into a green shape. The compressed material is sintered, cold reduced, and, if desired, annealed. The resulting rhenium alloy material retains desirable high temperature strength that is characteristic of rhenium. In addition the alloy provides improved high temperature ductility and is thus a desirable material for applications requiring high strength at high temperature.

In one embodiment, and by way of example only, there is provided a method of forming a rhenium-tantalum alloy comprising the steps of: mixing a blend of rhenium and tantalum wherein the amount of tantalum is within the solid solubility limits for rhenium; compressing the mixture of rhenium and tantalum to a green state; sintering the green compress of rhenium and tantalum so that the tantalum goes into solid solution with the rhenium; and cold rolling the sintered rhenium-tantalum alloy. Optionally the method includes the step of annealing the cold rolled rhenium-tantalum alloy.

The blend of rhenium and tantalum includes amounts of approximately 97 weight percent rhenium with approximately 3 weight per cent tantalum. Still alternatively the weight ratio of rhenium and tantalum within the alloy may be between approximately 99.9% Re/0.1% Ta to approximately 94.9% Re/5.1% Ta. The mixing step also includes blending powders of rhenium and tantalum. The mesh size of the powders should allow good blending and compression of the powders.

The step of compressing the powders may comprise compressing at any pressure that promotes compression to a green compact.

The step of sintering may comprise sintering at a temperature of between approximately 1800° C. and approximately 2200° C. for up to 10 hours.

The step of annealing may comprise annealing at a temperature of between approximately 1450° C. to approximately 1800° C. for up to 4 hours.

In a further embodiment, still by way of example only, there is provided a rocket component subject to high stress comprising a rhenium-tantalum alloy. The rocket component may be a valve seat, a valve poppet, a valve body, or a nozzle.

In still a further exemplary embodiment, there is provided a method of fabricating a rhenium/tantalum alloy that includes a cold rolling sufficient to disperse tantalum oxide impurities away from the grain boundaries of the alloy. Alternatively, the cold rolling is sufficient to affect a reduction in the concentration of a tantalum oxide impurity. Still as a further alternative, the cold rolling decreases the level of tantalum oxide impurities from a grain boundary by more than 10%.

Other independent features and advantages of the rhenium tantalum metal alloy will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

It has been noted that the ductility of rhenium is susceptible to degradation, especially at elevated temperatures. While the inventor does not wish to be held to any theory, it has been proposed that rhenium's high temperature ductility is affected by low grain boundary cohesion due to contaminants found at or near the grain boundaries. At high temperatures the condition of the grain boundary is often the limiting mechanism to mechanical integrity of a metal structure. Both oxygen and carbon have been identified as potential grain boundary contaminants. Oxygen is a likely contaminant due to the common presence of oxygen in the rhenium manufacturing process.

It has now been discovered that the addition of the element tantalum within the solubility limits in rhenium improves the high temperature ductility of rhenium. The theory is that tantalum acts as a getter for oxygen during rhenium processing steps. This theory is explained, not as a limitation to the invention, but as an aid in explaining the benefits of adding tantalum to rhenium. Tantalum has a higher thermodynamic driving force for oxide formation than does rhenium. After the formation of tantalum oxide in the grain boundaries, cold reduction (a normal manufacturing step) of the rhenium-tantalum product distributes the oxide of tantalum throughout the grain structure. This moves the tantalum oxide away from accumulation points in the grain boundary areas. Breaking up a continuous rhenium oxide film in the rhenium grain boundaries thereby increases grain boundary cohesion. This has the affect of improving and increasing the high temperature ductility of the resulting material as compared to pure rhenium. Consequently parts and components fabricated with the rhenium-tantalum alloy demonstrate improved high temperature performance. Unexpected failure is decreased, and the uniformity in performance is increased among similar parts.

In a preferred embodiment, a rhenium tantalum alloy with improved high temperature ductility is formed according to the following process. A compacted rhenium tantalum mix is first produced by combining a dominant amount of rhenium with a smaller amount of tantalum. The amount of tantalum mixed with rhenium should fall within the solid solubility limits of tantalum in rhenium. In a preferred embodiment, approximately 97 weight percent rhenium is combined with approximately 3 weight percent tantalum. The mesh size of the powders should allow good blending and compression of the powders. The preferred embodiment of the rhenium-tantalum alloy at the approximate ratio of 97%/3% is useful in the fabrication of rocketry components as described further below. However, other blends of rhenium and tantalum are possible. Blends of rhenium and tantalum are possible within the range of approximately 99.9% rhenium and approximately 0.1% tantalum up to approximately 94.9% rhenium and approximately 5.1% tantalum.

The rhenium and tantalum powders are mixed together so as to form a thoroughly mixed and intimately blended material. A preferred mixing time is up to approximately 4 hours. Industrial blenders for use in mixing metallic powders are an acceptable apparatus for performing this step.

The blended powder consisting of rhenium and tantalum is then pressed into a desired shape. The pressing step uses a cold isostatic pressing process. Various pressures may be used provided they are sufficient for the powder size to form a green compact. The green compact can also be pressed into various geometries and shapes depending on the mold that is used. The pressing results in a green compact of between about 75 to about 85 percent of theoretical density. The pressed compact results in a green body form. In this green body form the powders of rhenium and tantalum are deformed (or squeezed) thereby mechanically bonding with each other. A green body is characterized by distinct boundaries remaining between the powder granules of rhenium and the powder granules of tantalum. Two phases may be present, one of rhenium and a second of tantalum.

In the next step, the green compact is then sintered. Sintering takes place in a conventional sintering furnace. Preferably the sintering takes place under vacuum. During sintering, the green body is heated to a desired temperature. A preferred sintering temperature is up to about 2100° C. A preferred sintering time is between about 1 to about 4 hours. However, the acceptable temperature and time of sintering may vary. The time and temperature of the sintering step is sufficient when the tantalum in the green compact goes into solid solution with the dominant rhenium material. Thus, at the conclusion of the sintering step, the compact has transformed in substantial part to a single phase material comprising rhenium-tantalum alloy.

In the next step, the sintered compact is subjected to a cold reduction. The cold reduction is a conventional rolling step suitable for rhenium and rhenium dominated alloys. Cold rolling may include a single, or preferably, multiple rolling passes. Preferably a rolling step reduces a rhenium-tantalum alloy by up to 10 percent in linear thickness. As is known in the art, multiple rolling passes can be conducted to achieve a desired percentage reduction.

One purpose of the cold rolling step is to break up and distribute the presence of tantalum oxides within the rhenium-tantalum alloy. The sintering step provides sufficient energy for tantalum to react with impurities such as oxygen. These tantalum reactants may be present in the grain boundaries of the alloy. Thus, in one embodiment, the cold rolling in this step is sufficient when tantalum oxides and other tantalum reactants have been dispersed from overly concentrated areas. One level of rolling is rolling that decreases the concentration of tantalum oxides in a given location. It is also acceptable to affect a 10% or more lessening of tantalum reactants (including oxides) from the grain boundary area as between a pre-rolling and post-rolling material. Preferably, tantalum reactants are uniformly, or substantially uniformly, dispersed in the grain structures. Cold rolling is also acceptable that increases the homogeneity of the alloy with respect to the location of tantalum oxide impurities within the grain structure of the alloy so that a post rolling alloy has tantalum oxide impurities more evenly distributed within the grains than before the cold rolling step.

A further purpose of the cold reduction is to reduce voids in the sintered material. The pressed powders that form the green compact may include voids and interstices. Some voids may remain after the sintering operation, especially so when the sintering is done at lower temperature for shorter time periods. The cold rolling will further compress the material and thus tends to squeeze out the presence of voids. Thus cold rolling is also important to bring the material to a desired condition with respect to strength.

A final step in the manufacturing process includes an optional annealing step. Annealing involves additional heating of the rhenium-tantalum material. Annealing can be used to achieve various goals. For example, annealing can be used to alter the grain size of the alloy from its condition after rolling. An annealing may increase the grain size. An annealing step includes heating between a temperature of approximately 1450° C. to approximately 1800° C. for up to 4 hours.

In a preferred embodiment, rhenium tantalum alloys are used in the fabrication of certain parts. In particular it has been discovered that rhenium-tantalum alloy is advantageous when used with rocketry parts such as rocket nozzles, high temperature valve bodies, poppets, and valve seats. These components and others associated with thrust vector control (TVC) systems are subject to high temperature stresses. Thus their performance is enhanced when fabricated with the improved rhenium tantalum alloy.

TVC components are frequently composites that include a carbon (typically graphite) substrate with a metallic overlay. Carbon, and particularly the graphite form of carbon, possesses the physical properties which make it a useful construction material. Graphite demonstrates high strength and dimensional stability at elevated temperatures. Disadvantageously carbon and carbon composites are susceptible to corrosion, oxidation, and erosion when exposed to oxidizing or corrosive environments. The environment in rocket exhaust gases is one kind of hostile environment that can lead to the breakdown of carbon structures. Thus a protective coating, such as rhenium, is used to cover the surface of carbon materials exposed to rocket exhaust.

Thus in a preferred embodiment, composite materials are created that comprise a carbon substrate and a rhenium-tantalum alloy protective layer. These materials are in turn used to fashion TVC components such as valves, valve bodies, poppets, seals, and nozzles. The rhenium-tantalum alloy used is the alloy as described herein. The alloy may be deposited on the carbon substrate using any of the known deposition methods including chemical vapor deposition. Melt application may also be used.

Components fabricated in whole or part of the rhenium-tantalum alloy will have advantages over those components made of pure rhenium. In particular, the alloy will display improved high temperature ductility. Thus the component will be less prone to catastrophic failure or degradation at high temperatures and pressures. Further the new component will display consistency in performance.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:
1. A method of forming a rhenium-tantalum alloy comprising the steps of:
   mixing a blend of rhenium and tantalum wherein the amount of tantalum is within the solid solubility limits for rhenium;
   compressing the mixture of rhenium and tantalum to a green state;
   sintering the green compress of rhenium and tantalum so that the tantalum goes into solid solution with the rhenium; and
   cold rolling the sintered rhenium-tantalum alloy.
2. The method according to claim 1 further comprising the step of annealing the cold rolled rhenium-tantalum alloy.
3. The method according to claim 1 wherein the step of mixing further comprises a blend of approximately 97 weight percent rhenium with approximately 3 weight percent tantalum.
4. The method according to claim 1 wherein the weight ratio of rhenium and tantalum is between approximately 99.9% Re/0.1% Ta to approximately 94.9% Re/5.1% Ta.
5. The method according to claim 1 wherein the step of compressing further comprises compressing at a pressure sufficient to compress the powders to a green compact.
6. The method according to claim 1 wherein the step of sintering further comprises sintering at a temperature of between approximately 1800° C. and approximately 2200° C. for up to 4 hours.
7. The method according to claim 1 wherein the step of cold rolling further comprises cold rolling.
8. The method according to claim 1 wherein the step of annealing further comprises annealing at a temperature of between approximately 1450° C. to approximately 1800° C. for up to 4 hours.
9. A method for making a rhenium-tantalum alloy with improved high temperature ductility comprising the steps of:
   providing a rhenium powder and a tantalum powder wherein the weight ratio of rhenium and tantalum is between approximately 96.5% Re/3.5% Ta and approximately 97.5% Re/2.5% Ta;
   mixing the rhenium and tantalum powders to form a homogenous blend;
   compressing the mixture of rhenium and tantalum powders to form a green compact;
   sintering the green compact of rhenium and tantalum powder so that the tantalum goes into solid solution with the rhenium; and
   cold rolling the sintered rhenium-tantalum alloy so as to distribute tantalum oxides from a grain boundary location.
10. The method according to claim 9 wherein the step of cold rolling further comprises cold rolling sufficient to disperse tantalum oxide impurities away from the grain boundaries of the alloy.
11. The method according to claim 9 wherein the step of cold rolling further comprises cold rolling that affects a reduction in the concentration of a tantalum oxide impurity.
12. The method according to claim 9 wherein the step of cold rolling further comprises a cold rolling that decreases the level of tantalum oxide impurities from a grain boundary by more than 10%.
13. The method according to claim 9 wherein the step of cold rolling further comprises cold rolling that increases the homogeneity of the alloy with respect to the location of tantalum oxide impurities within the grain structure.
14. A rocket thrust vector control component subject to high stress comprising a carbon substrate and a rhenium- tantalum alloy protective layer disposed on the carbon substrate, wherein the rhenium-tantalum alloy has received a cold rolling treatment.

15. The component according to claim 14 wherein said component comprises a valve seat.

16. The component according to claim 14 wherein said component comprises a valve poppet.

17. The component according to claim 14 wherein said component comprises a valve body.

18. The component according to claim 14 wherein said component comprises a nozzle.

19. The component according to claim 14 wherein the rhenium-tantalum alloy protective layer comprises an alloy with rhenium and an amount of tantalum that is within the solid solubility limits for rhenium.

20. The component according to claim 14 wherein the rhenium-tantalum alloy protective layer comprises an alloy with approximately 97 weight percent rhenium and approximately 3 weight percent tantalum.

21. The component according to claim 14 wherein the rhenium-tantalum alloy protective layer comprises an alloy wherein the weight ratio of rhenium and tantalum is between approximately 99.9% Re/0.1% Ta to approximately 94.9% Re/5.1% Ta.

* * * * *